(12) United States Patent
Hildebrand et al.

(10) Patent No.: US 9,377,008 B2
(45) Date of Patent: Jun. 28, 2016

(54) WIND ENERGY INSTALLATION HAVING A SYNCHRONOUS GENERATOR, AND SLOWLY ROTATING SYNCHRONOUS GENERATOR

(75) Inventors: Arno Hildebrand, Wittmund (DE); Christian Baumgaertel, Aurich (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 0 days.

(21) Appl. No.: 13/883,541

(22) PCT Filed: Oct. 31, 2011

(86) PCT No.: PCT/EP2011/069117
§ 371 (c)(1),
(2), (4) Date: Jul. 11, 2013

(87) PCT Pub. No.: WO2012/059463
PCT Pub. Date: May 10, 2012

(65) Prior Publication Data
US 2013/0277983 A1    Oct. 24, 2013

(30) Foreign Application Priority Data

Nov. 4, 2010 (DE) .......................... 10 2010 043 429
Mar. 10, 2011 (DE) .......................... 10 2011 005 390

(51) Int. Cl.
| | | |
|---|---|---|
| F03D 9/00 | (2006.01) | |
| H02K 7/18 | (2006.01) | |
| H02K 9/19 | (2006.01) | |

(52) U.S. Cl.
CPC .............. *F03D 9/002* (2013.01); *H02K 7/1838* (2013.01); *H02K 9/19* (2013.01); *F05B 2260/64* (2013.01); *Y02E 10/721* (2013.01); *Y02E 10/725* (2013.01)

(58) Field of Classification Search
CPC ......... F03D 9/002; H02K 9/19; H02K 7/1838
USPC ................. 290/44, 55; 310/12.29, 52, 54, 57, 310/216.119, 227
See application file for complete search history.

(56) References Cited

U.S. PATENT DOCUMENTS

| | | | |
|---|---|---|---|
| 5,139,055 A | 8/1992 | Pollard | |
| 6,326,709 B1 | 12/2001 | Adelmann et al. | |
| 6,424,062 B1 * | 7/2002 | Adelmann et al. | .............. 310/53 |
| 7,064,463 B2 | 6/2006 | Matin et al. | |
| 7,208,854 B1 * | 4/2007 | Saban et al. | ..................... 310/61 |
| 7,730,713 B2 * | 6/2010 | Nakano et al. | ............... 60/39.83 |
| 8,198,764 B2 | 6/2012 | Booth et al. | |
| 8,203,252 B2 | 6/2012 | Gottfried | |
| 8,552,576 B2 | 10/2013 | Wobben | |
| 9,006,917 B2 | 4/2015 | Versteegh | |

(Continued)

FOREIGN PATENT DOCUMENTS

| | | |
|---|---|---|
| CN | 1292166 A | 4/2001 |
| CN | 198679 A | 6/2007 |

(Continued)

*Primary Examiner* — Pedro J Cuevas
*Assistant Examiner* — Viet Nguyen
(74) *Attorney, Agent, or Firm* — Seed Intellectual Property Law Group PLLC (57) ABSTRACT

There is provided a wind power installation comprising a synchronous generator which has a generator stator and a generator rotor for producing electric energy. The wind power installation further has a fluid cooling system for cooling the generator rotor.

17 Claims, 11 Drawing Sheets

(56) References Cited

U.S. PATENT DOCUMENTS

| | | | |
|---|---|---|---|
| 2006/0071568 A1* | 4/2006 | Kimura et al. | 310/156.56 |
| 2008/0003105 A1* | 1/2008 | Nies | 416/95 |
| 2008/0236794 A1 | 10/2008 | St. Louis | |
| 2009/0229291 A1* | 9/2009 | Winn | 62/259.2 |
| 2010/0034653 A1* | 2/2010 | Frokjaer | 416/39 |
| 2010/0148514 A1* | 6/2010 | Sato et al. | 290/55 |
| 2010/0194221 A1* | 8/2010 | Kori et al. | 310/61 |
| 2010/0264667 A1* | 10/2010 | Barber | 290/55 |
| 2011/0241350 A1* | 10/2011 | Kori et al. | 290/55 |
| 2012/0217756 A1* | 8/2012 | Balzer et al. | 290/55 |

FOREIGN PATENT DOCUMENTS

| | | |
|---|---|---|
| CN | 101728898 A | 6/2010 |
| CN | 101821926 A | 9/2010 |
| DE | 199 19 040 A1 | 9/2000 |
| DE | 600 29 977 T2 | 3/2007 |
| DE | 10 2007 042 338 A1 | 3/2009 |
| DE | 102007042338 A1 | 3/2009 |
| DE | 202010009460 U1 | 10/2010 |
| DE | 10 2009 050 004 A1 | 4/2011 |
| EP | 1 032 113 A1 | 8/2000 |
| EP | 1185790 B1 | 10/2004 |
| EP | 1 881 194 A1 | 1/2008 |
| EP | 2 143 943 A1 | 1/2010 |
| EP | 2 182 617 A1 | 5/2010 |
| GB | 978254 | 12/1964 |
| JP | 58-97975 U | 7/1983 |
| JP | 59-117442 A | 7/1984 |
| JP | 4-229049 A | 8/1992 |
| JP | 5-161312 A | 6/1993 |
| JP | 2002-537748 A | 11/2002 |
| JP | 2003-343417 A | 12/2003 |
| JP | 2005-69082 A | 3/2005 |
| JP | 2006-158105 A | 6/2006 |
| RU | 2 054 781 C1 | 2/1996 |
| RU | 2 339 145 C1 | 11/2008 |
| SU | 383164 A1 | 5/1973 |
| SU | 508871 A1 | 6/1976 |
| TW | 177321 | 1/1992 |
| WO | 2006/032515 A1 | 3/2006 |
| WO | 2009/115100 A1 | 9/2009 |
| WO | 2010/024650 A2 | 3/2010 |
| WO | 2010/040659 A2 | 4/2010 |
| WO | 2010/097838 A1 | 9/2010 |

* cited by examiner

WIND ENERGY INSTALLATION HAVING A SYNCHRONOUS GENERATOR, AND SLOWLY ROTATING SYNCHRONOUS GENERATOR

BACKGROUND

1. Technical Field

The present invention concerns a wind power installation comprising a synchronous generator and a slowly rotating synchronous generator.

2. Description of the Related Art

Wind power installations comprising a separately excited synchronous generator have been known for years for example from Enercon. In that case a rotor of the wind power installation (the rotating part of the pod) can be connected directly to the rotor of the synchronous generator and drives the rotor of the generator to thereby generate electric energy.

It is desirable in that case to increase the nominal power output of the synchronous generators without substantially increasing the diameter of the synchronous generator.

DE 10 2009 050 004 A1 discloses an electric generator having a rotor, a stator surrounding the rotor and a water-operated cooling device having a water inlet, a water outlet and passages in the rotor and the stator for passing cooling water therethrough. The water-operated cooling device is the sole cooling device of the generator.

DE 600 29 977 T2 discloses a wind power installation having a rotor and a stator. A cooling unit serves to pass cooling liquid through the stator in order thereby to dissipate the heat from the generator.

BRIEF SUMMARY

There is provided a wind power installation comprising a synchronous generator which has a generator stator and a generator rotor. The wind power installation further has a fluid cooling system for cooling the generator rotor.

In an aspect of the present invention the fluid cooling system has at least one heat exchanger and at least one cooling passage in the generator rotor. Cooling fluid flows through the at least one heat exchanger and the at least one cooling passage in the generator rotor.

In a further aspect of the invention the fluid cooling system has a filter unit for filtering the cooling fluid, a pump unit for pumping the cooling fluid through the cooling circuit, and an expansion vessel.

In a further aspect of the invention the fluid cooling system is provided in or at an (aerodynamic) rotor of the wind power installation. Thus the entire fluid cooling system is disposed in the rotating part of the wind power installation. It is possible in that way to ensure that there does not have to be a complicated transition between the rotating and stationary parts of the wind power installation.

In a further aspect of the invention the cooling system has a compensation vessel for receiving excess cooling fluid and the compensation vessel is provided in the (aerodynamic) rotor of the wind power installation and thus rotates therewith.

The generator rotor has a pole shoe carrier having a plurality of pole shoes provided distributed at the periphery of the pole shoe carrier. The pole shoe carrier further has at least one cooling passage through which the cooling fluid can flow in order thereby to indirectly cool the pole shoes.

The at least one cooling passage is coupled to a cooling circuit which has at least one heat exchanger at the outside of the rotor of the wind power installation or the spinner casing.

The heat exchanger can further be integrated in or at the casing of the rotor or the spinner.

A compensating vessel and/or a dirt trap can be provided in the cooling circuit. The cooling circuit further has a pump for pumping the cooling fluid through the cooling circuit. The cooling fluid can be for example water with a proportion of glycol.

The synchronous generator according to the invention is preferably a separately excited synchronous generator and involves a rotary speed of up to 50 revolutions per minute, that is to say it is a slowly rotating synchronous generator.

In an aspect of the invention there is provided a dirt filter unit in the cooling circuit for filtering particles or dirt in the cooling fluid. The filter is designed to be interchangeable so that cleaning of the filter is made possible.

In a further aspect of the invention the pump is continuously operated up to a previously established period of operation. After that previously established period of operation the pump can be operated if required. After the previously established period of operation the filter can be cleaned or exchanged so it is possible to ensure that the particles or the dirt in the cooling fluid has been filtered out.

The invention also concerns a slowly rotating synchronous generator having a generator stator, a generator rotor and a fluid cooling system for cooling the generator rotor, wherein the fluid cooling system is provided in or at the generator rotor. Thus there is provided a slowly rotating synchronous generator having a fluid cooling system which rotates with the generator rotor. The fluid cooling system can have a heat exchanger and a cooling passage in the generator rotor, wherein the cooling fluid flows through the at least one heat exchanger and the cooling passage in the generator rotor.

The invention concerns the idea of indirectly cooling the rotor and in particular the pole shoes by a fluid cooling system.

BRIEF DESCRIPTION OF THE SEVERAL VIEWS OF THE DRAWINGS

Advantages and embodiments by way of example of the invention are described in greater detail hereinafter with reference to the drawing.

DETAILED DESCRIPTION

Figure 1:
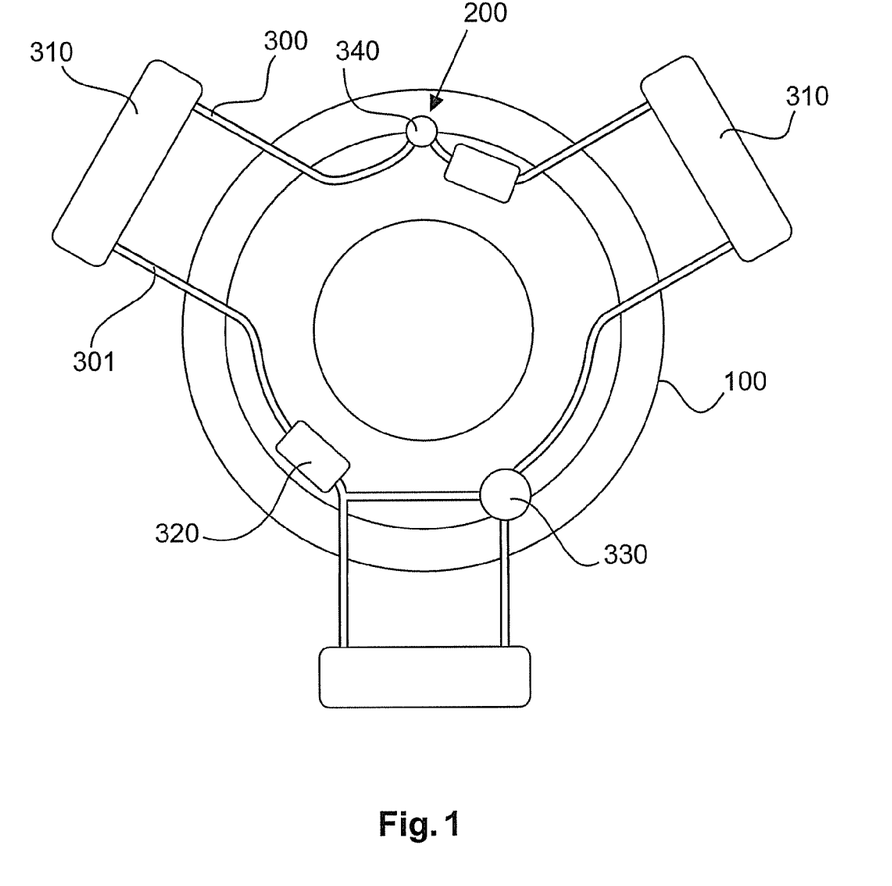
FIG. 1 shows a diagrammatic sectional view of a wind power installation according to a first embodiment.

FIG. 1 shows a diagrammatic view of a wind power installation according to a first embodiment. The wind power installation has a pod 100 (with a spinner and a spinner casing or an aerodynamic rotor), a generator rotor 200 and a cooling system 300. The generator rotor 200 is provided within the pod casing 100. The cooling system 300 is a fluid cooling system with a cooling circuit in which a cooling fluid flows. That cooling fluid can represent for example a combination of water and glycol. The cooling system 300 has at least one heat exchanger 310 which can be provided outside the pod or spinner casing 100. Alternatively thereto the at least one heat exchanger 310 can be integrated in or at the pod casing 100. The cooling system 300 further has a plurality of cooling pipes 301, a pump unit 320, optionally an expansion vessel 330 and optionally a filter unit or dirt trap unit 340 and at least one cooling passage 340 in the generator rotor 200.

Due to the cooling system of the first embodiment and the associated cooling circuit, cooling fluid can flow through the cooling passages 340 into the generator rotor 200 and thus cool the generator rotor 200. The cooling fluid heated by the generator rotor can be cooled down by the heat exchanger 310. The cooling system 300 is disposed in or at the aerodynamic rotor or the spinner casing of the wind power installation, that is to say the cooling system is in or at the rotating part of the wind power installation.

Figure 2:
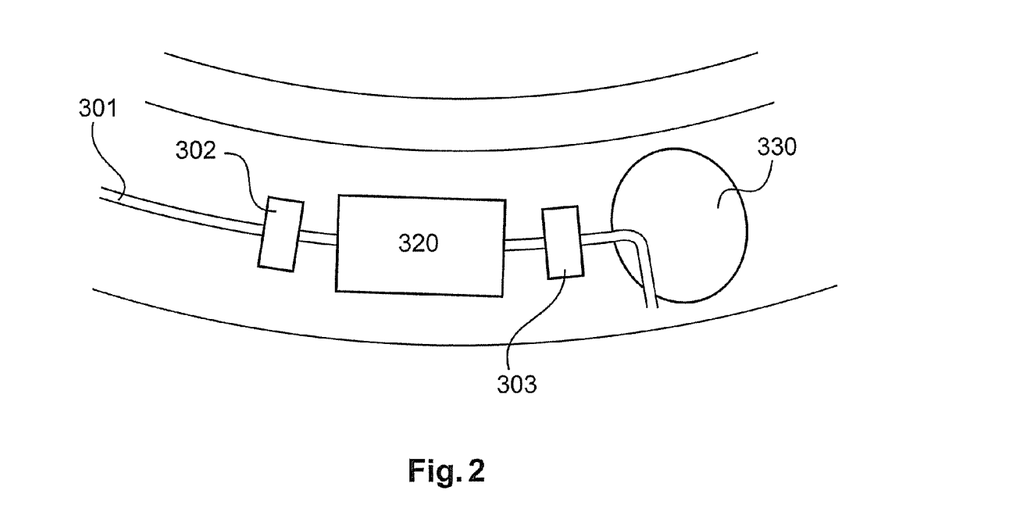
FIG. 2 shows a diagrammatic view of a part of a cooling system of a wind power installation according to the first embodiment.

FIG. 2 shows a first portion of the cooling system according to the first embodiment. In that respect, provided in FIG. 2 are the pump unit 320, the compensation vessel 330, an overpressure safety valve 302 and optionally a pressure sensor 303. The pump unit 320 serves to pump cooling fluid through the cooling system. The compensation vessel 330 serves in that case to receive excess cooling fluid so that the pressure within the cooling system does not exceed a predetermined value.

Figure 3:
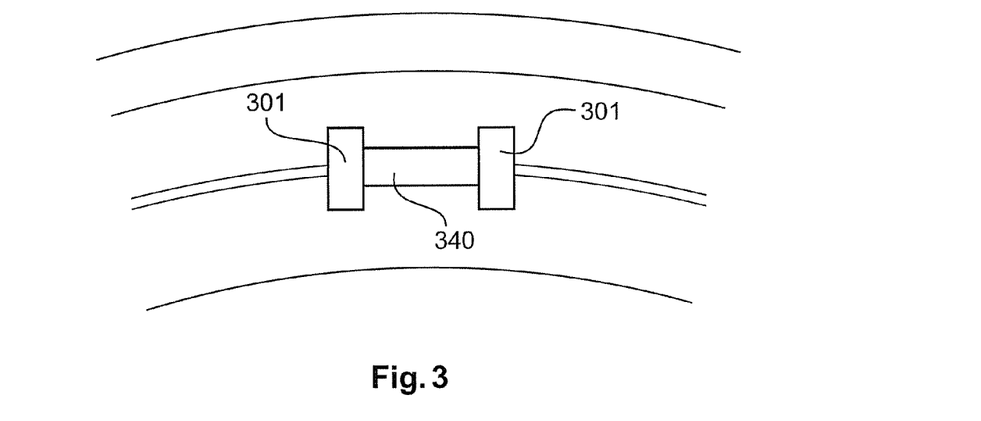
FIG. 3 shows a diagrammatic view of a further portion of a cooling system of a wind power installation according to the first embodiment.

FIG. 3 shows a second portion of the cooling system according to the first embodiment. The cooling system has cooling pipes 301 and a filter unit or a dirt trap unit 340. The dirt trap unit 340 is adapted to be interchangeable. In that way the filter unit can be exchanged or cleaned as required.

In the first embodiment of the invention the pump unit 320 can be operated for a predetermined number of operating hours (for example 300 h). The pump is continuously operated until those operating hours are reached. After the established period of operation is reached, the filter unit 340 is cleaned or exchanged. After exchanging or cleaning the filter unit, the pump is operated only when required. It is possible in that way to provide that the cooling fluid is cleaned of particles and dirt in the first period of time until the previously established period of operation is reached. As the cooling system represents a closed cooling system, there should not be any further particles or any further dirt in the cooling fluid after exchange or cleaning of the filter unit so that the pump can be activated only when required.

Figure 4:
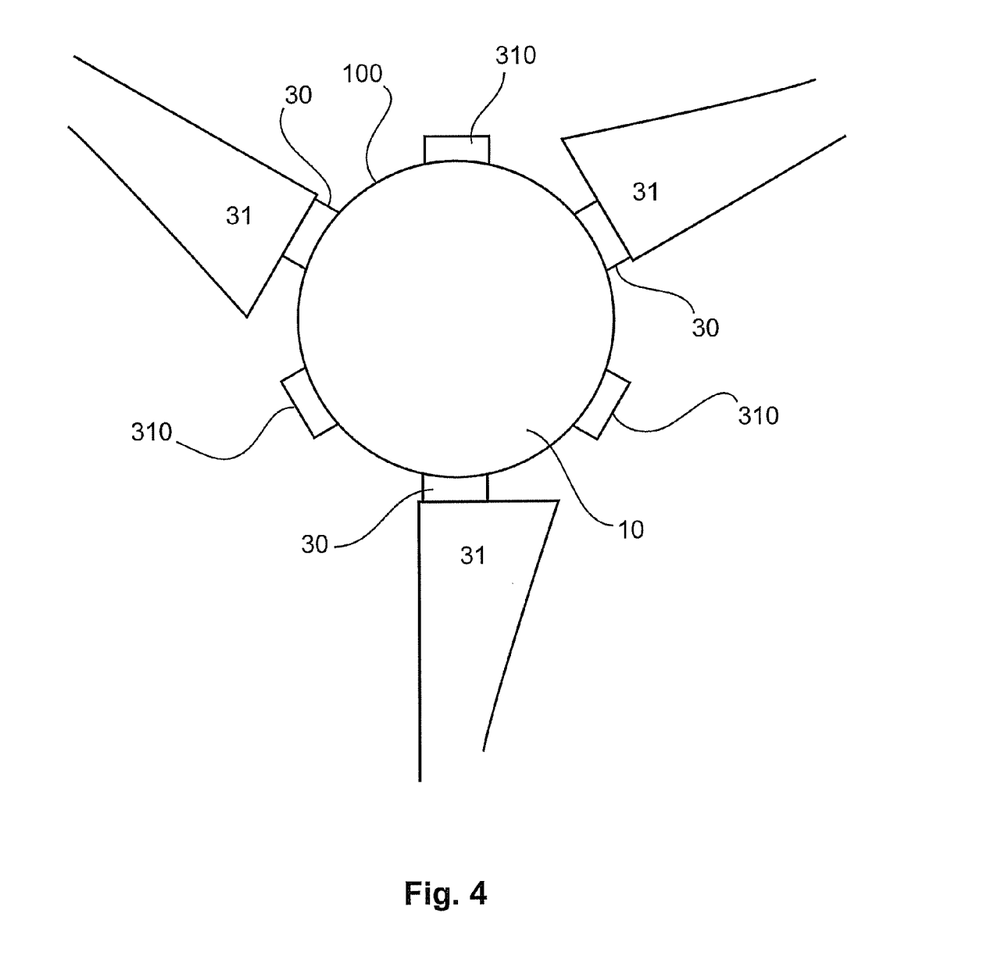
FIG. 4 shows a diagrammatic view of a pod of a wind power installation according to the second embodiment.

FIG. 4 shows a diagrammatic view of a pod of a wind power installation according to a second embodiment. In this case the pod has an aerodynamic rotor (a rotating part) 10 (with a spinner casing) and a rear—non-rotating—part (not shown). Connections 30 for the rotor blades 31 are provided on the aerodynamic rotor 10. At least one heat exchanger 310 is provided externally on the rotor 10. That heat exchanger 310 in accordance with the second embodiment can correspond to the heat exchanger 310 of the first embodiment. The heat exchanger 310 of the second embodiment is part of a fluid cooling system for cooling the generator rotor. In this case the cooling system of the second embodiment can correspond to the cooling system of the first embodiment.

Figure 5:
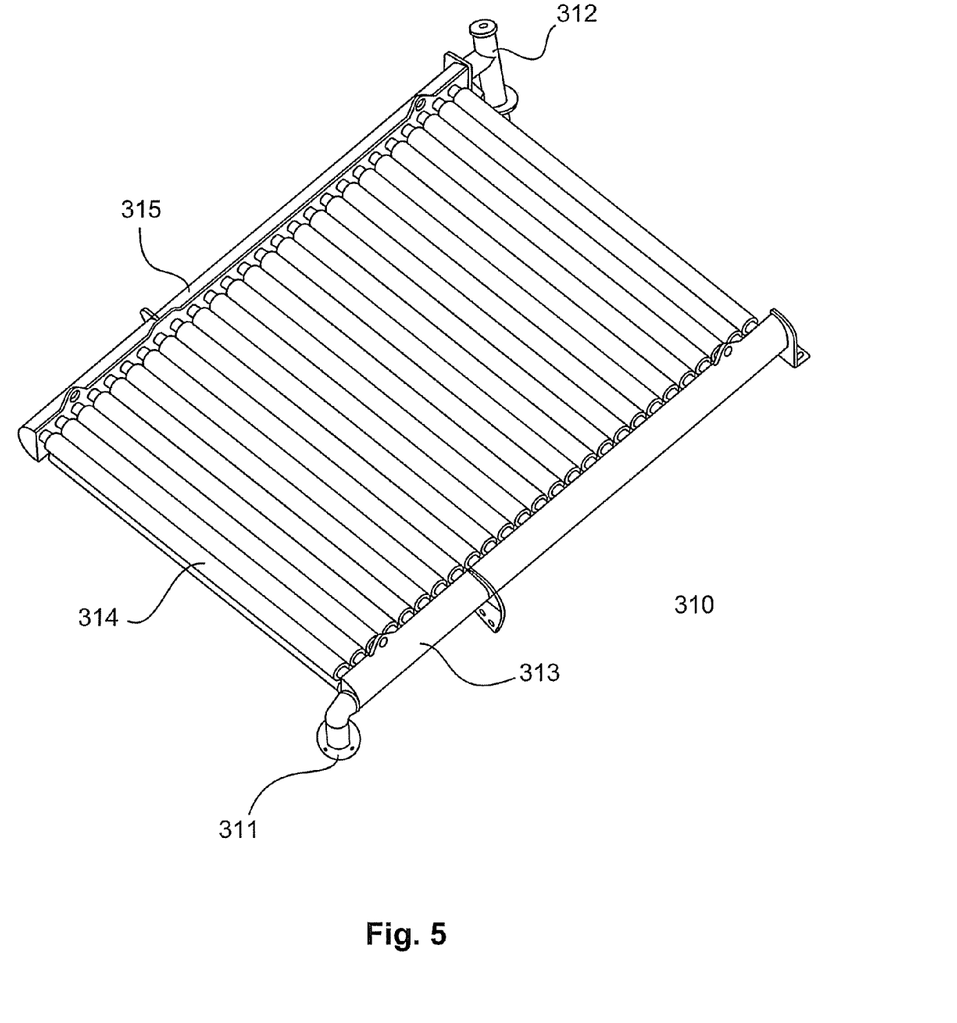
FIG. 5 shows a diagrammatic view of a heat exchanger of a cooling system of a wind power installation according to a third embodiment.

FIG. 5 shows a diagrammatic view of a heat exchanger 310 according to a third embodiment. In this case the heat exchanger 310 of the third embodiment can also be used as the heat exchanger in the first or second embodiments.

The heat exchanger 310 has a feed flow means or discharge flow means 311, a first pipe portion 313, a plurality of cooling pipes 314 and a second pipe portion 315 connected to a discharge flow means or feed flow means 312 respectively. A plurality of cooling pipes 314 are provided between the first and second pipe portions 313, 315. The cooling fluid flows in this case through the portions 313, 314 and through the plurality of cooling pipes 314.

Figure 6:
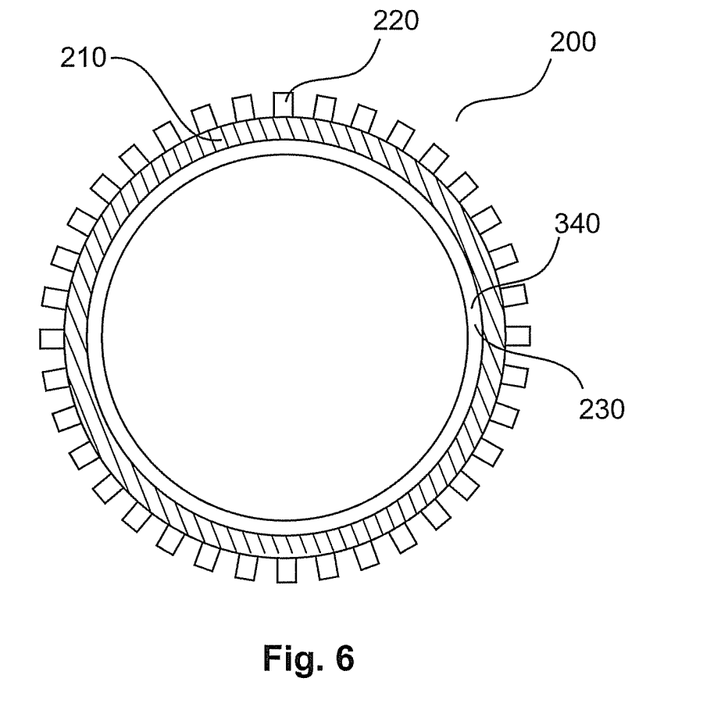
FIG. 6 shows a diagrammatic view of a generator rotor of a wind power installation according to a third embodiment.

FIG. 6 shows a diagrammatic cross-section of a synchronous generator rotor of a wind power installation according to a third embodiment. The generator rotor 200 has a pole shoe carrier 210 having a plurality of pole shoes 220 and at least one cooling passage 230. The cooling fluid of the cooling circuit can flow in the cooling passage 230 and can thus indirectly cool the pole shoes 220. That cooling passage 230 can represent the cooling passage 340 of the cooling system and can be provided for cooling the generator rotor.

Figure 7:
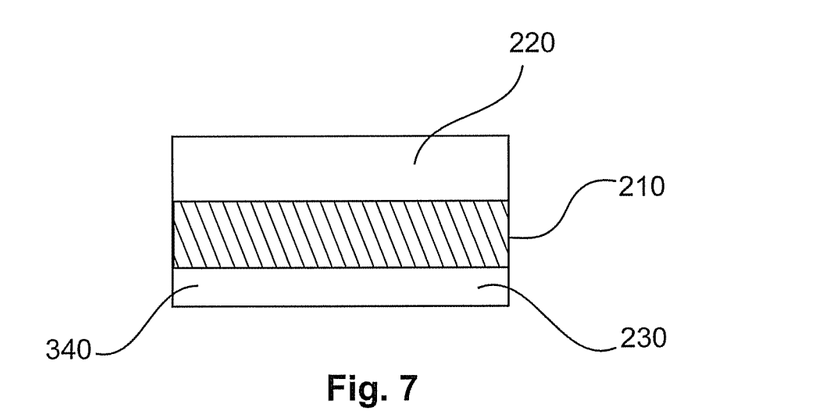
FIG. 7 shows a diagrammatic sectional view of the rotor of FIG. 6.

FIG. 7 shows a diagrammatic sectional view of the rotor of FIG. 6. The generator rotor has a plurality of pole shoes 220 on a pole shoe carrier 210. The generator rotor further has at least one cooling passage 230 beneath the pole shoe carrier 210. That cooling passage can be in the form of a cooling passage or in the form of a plurality of cooling passages.

The cooling fluid according to the invention preferably has a frost protection means so that it is possible to ensure that the cooling fluid does not freeze, even if a network failure occurs and the wind power installation cannot take any electric energy from the network to operate for example the pump. The addition of frost protection agents to the cooling fluid therefore ensures that the cooling fluid does not freeze even when the wind power installation is stopped.

The rotary speed of the synchronous generator according to the invention is in the range of between 0 and 50 revolutions per minute and in particular between 0 and 20 revolutions per minute.

Exciter current which is fed into the rotor winding, can be increased by the provision of the fluid cooling system for cooling the generator rotor and in particular the pole shoes. Without the fluid cooling system and indirect cooling of the pole shoes, that is linked thereto, the pole shoes could become excessively hot with an increased exciter current so that the pole shoes can suffer damage. The fluid cooling system according to the invention thus ensures that, by virtue of indirect cooling the pole shoes are sufficiently cooled and do not exceed a previously established temperature threshold value.

Figure 8A:
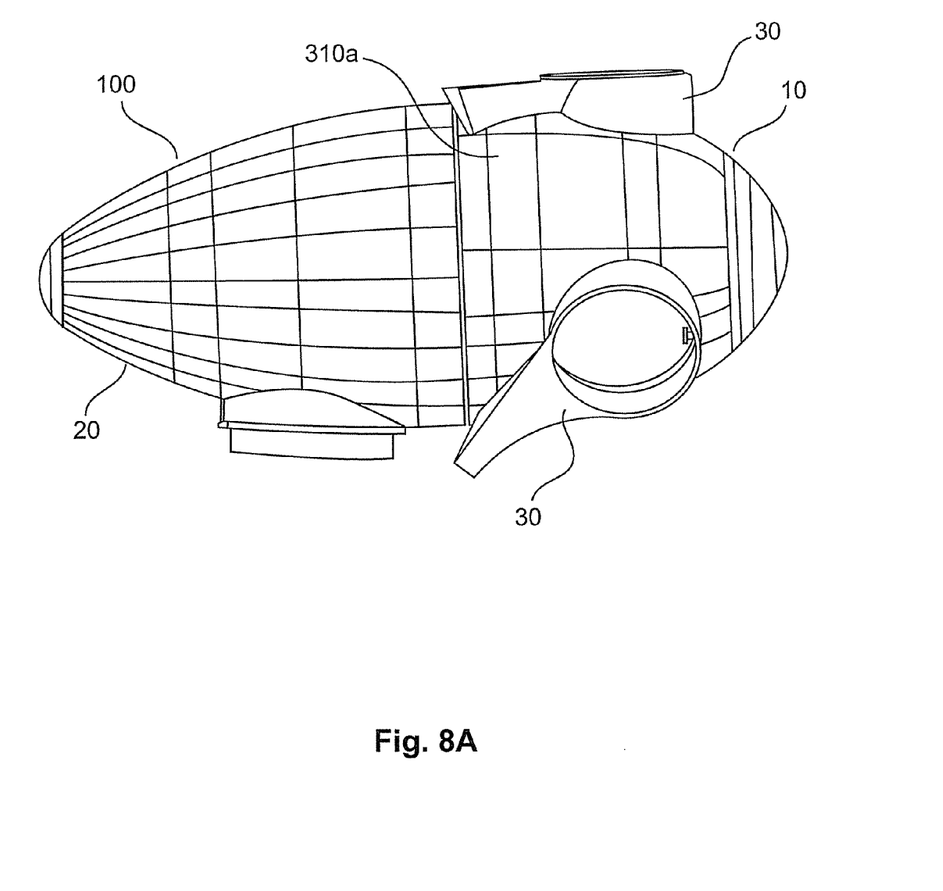
FIG. 8A shows a diagrammatic view of a pod of a wind power installation according to a fourth embodiment.

FIG. 8A shows a diagrammatic view of a pod of a wind power installation according to a fourth embodiment. The pod of the fourth embodiment has a non-rotating part 20 and a rotating rotor 10. Connections 30 for the rotor blades are provided on the rotor 10. In addition at least one heat exchanger 310a is provided on the rotor 10. The heat exchanger 310a is integrated into the spinner casing or the outer skin of the rotor 10. The heat exchanger of the fourth embodiment can be used together with the cooling system of the first, second or third embodiment.

Figure 8B:
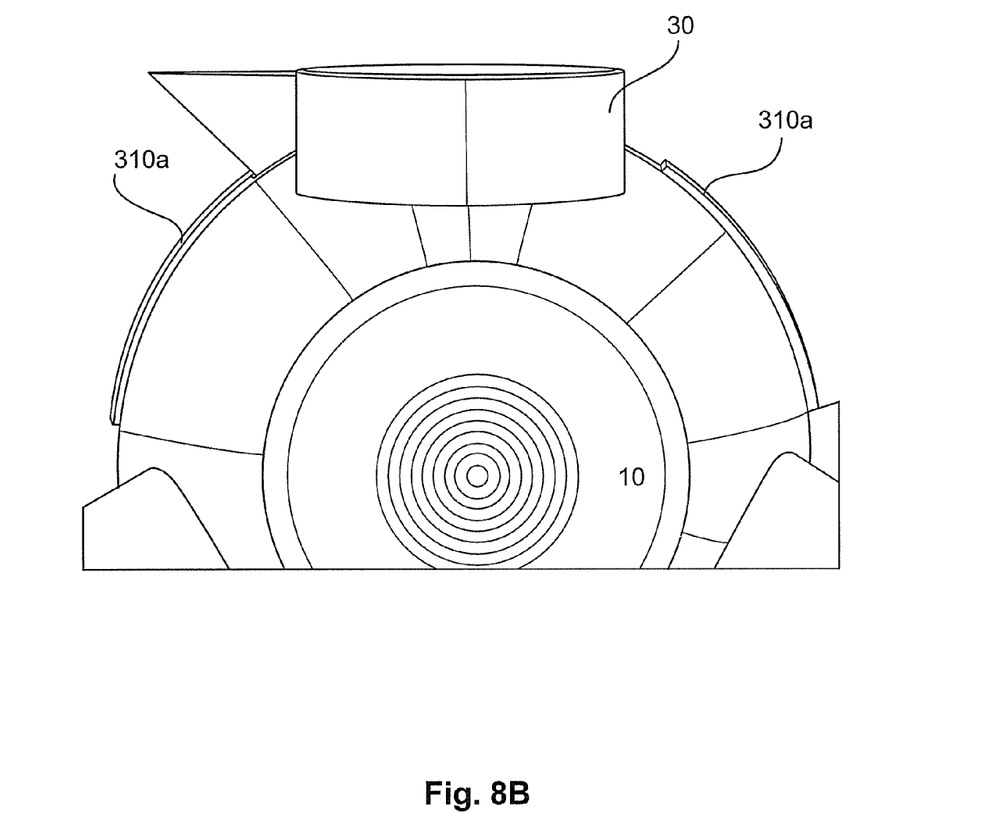
FIG. 8B shows a plan view of the pod of FIG. 8A.

FIG. 8B shows a plan view of the pod of FIG. 8A. The heat exchanger 310a are adapted to the external configuration or form of the rotor 10, they are integrated into the spinner casing or the outer skin of the rotor 10, that is to say in the illustrated embodiment the heat exchangers are of a curved configuration.

Figure 9:
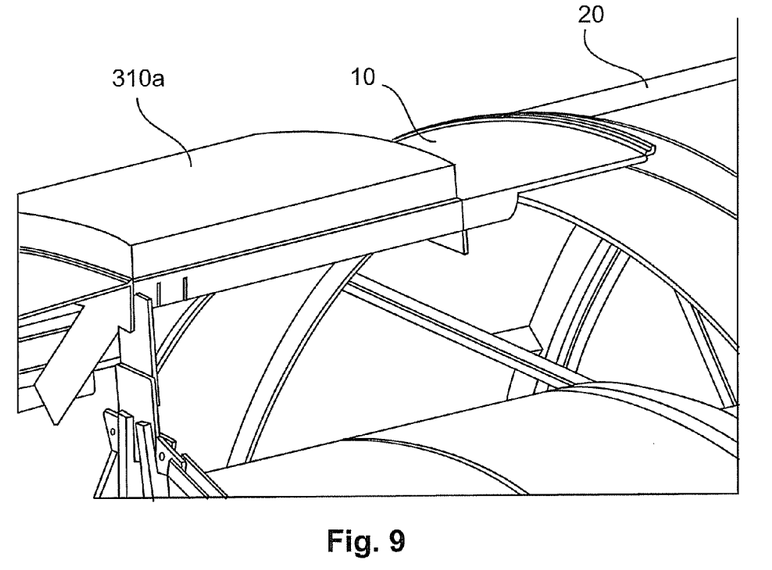
FIG. 9 shows a partial sectional view of the pod of the wind power installation according to the fourth embodiment.

FIG. 9 shows a partial sectional view of the pod of the wind power installation of the fourth embodiment. The heat exchanger 310a is integrated into the spinner casing or the outer skin of the rotor 10, that is to say the heat exchangers are of a curved or arcuate configuration.

Figure 10:
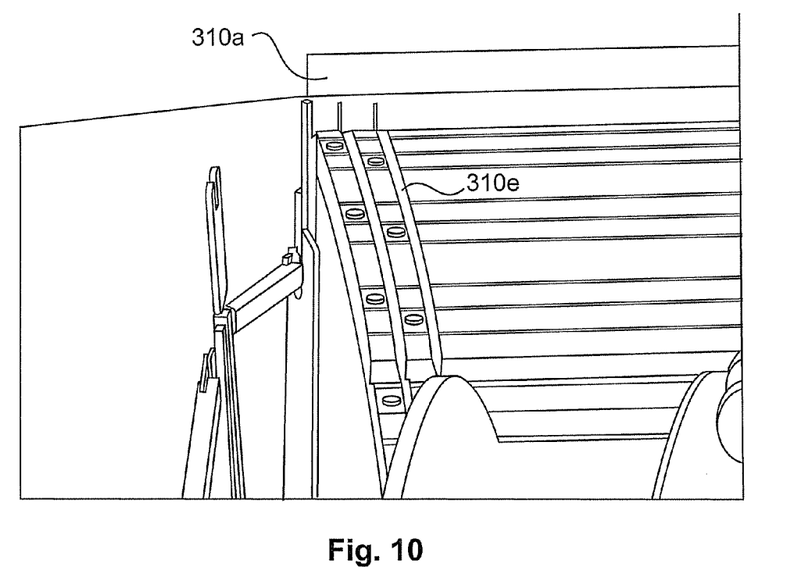
FIG. 10 shows a further partial sectional view of the pod of the wind power installation according to the fourth embodiment.

FIG. 10 shows a further partial sectional view of the pod of the wind power installation according to the fourth embodiment. It can also be seen from FIG. 10 that the heat exchanger 310a is integrated in or at the outer casing of the rotor. In this case optionally a part of the heat exchanger 310a can project out beyond the spinner casing or the rotor outer skin. The heat exchanger 310a can be reinforced at the inside by support plates or limbs. The heat exchanger 310a can comprise a plurality of modules which are fitted together (for example welded).

Figure 11:
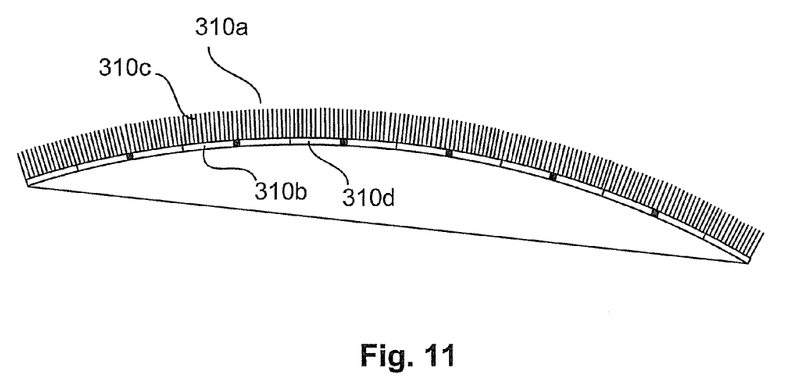
FIG. 11 shows a diagrammatic sectional view of a portion of the pod of the wind power installation according to the fourth embodiment.

FIG. 11 shows a diagrammatic view of the heat exchanger 310a. The heat exchanger 310a has a base unit 310b with a plurality of passages 310d. Provided on the base unit 310b are a plurality of cooling ribs 310c. In this case the cooling ribs are oriented in the direction of the axis of rotation of the rotor. Alternatively thereto they can also be oriented at an angle of for example 30° relative to the axis of rotation.

Figure 12:
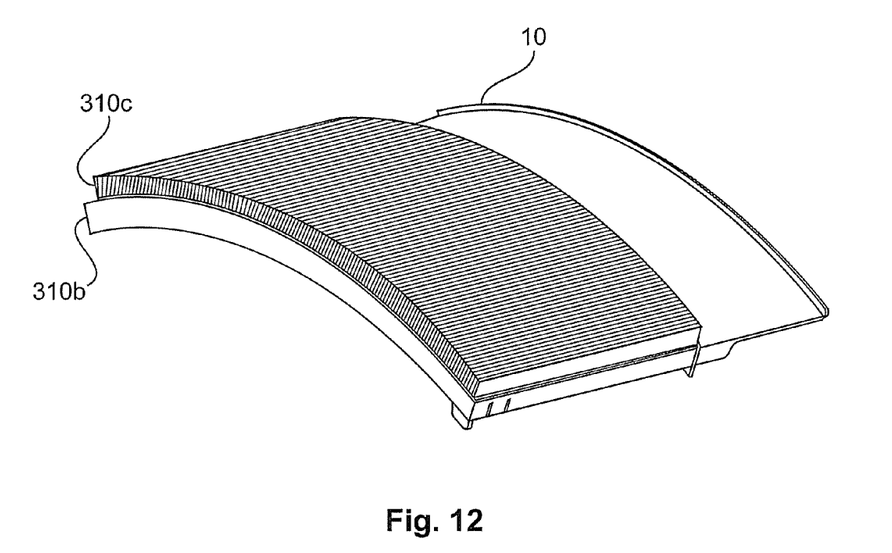
FIG. 12 shows a diagrammatic view of a part of the pod of the wind power installation according to the fourth embodiment.

FIG. 12 shows a perspective view of the heat exchanger of the fourth embodiment. The heat exchanger 310a has a plurality of cooling ribs 310c arranged in parallel. Those cooling ribs 310c can project beyond the outer surface of the rotor 10. In operation of the wind power installation the wind will flow along the cooling ribs 310c and will contribute to cooling the cooling ribs 310c. In the fourth embodiment the heat exchanger 310a is of an arcuate configuration so that it is adapted to the outer skin of the rotor. The heat exchanger 310a can comprise a plurality of heat exchanger modules which for example are welded together. In this case the weld seams are preferably parallel to the axis of rotation of the rotor.

Figure 13:
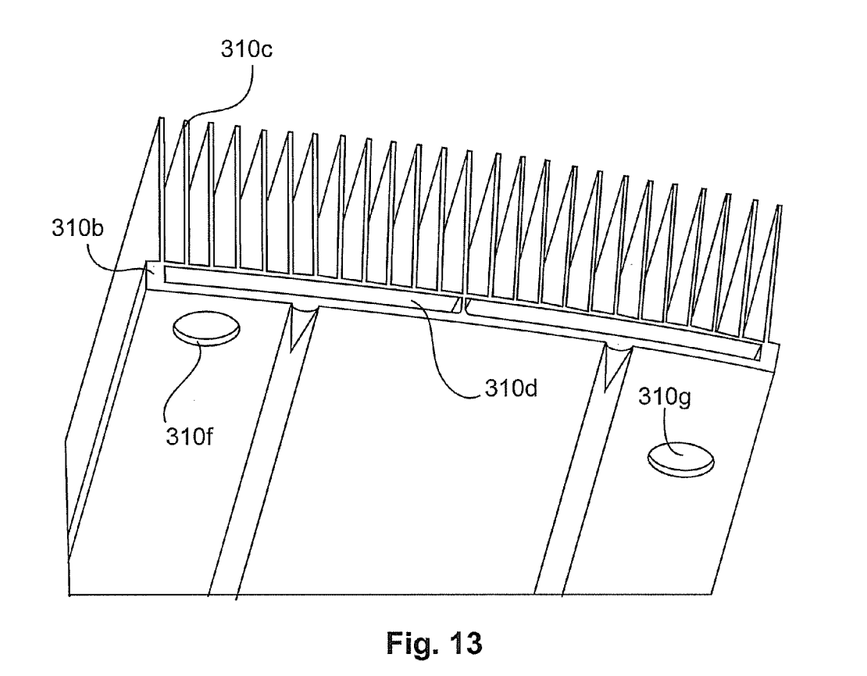
FIG. 13 shows a perspective view of a heat exchanger for a pod according to the fourth embodiment.

FIG. 13 shows a perspective sectional view of the heat exchanger of the fourth embodiment. The heat exchanger has a base unit 310b with for example two passages 310d. Provided on the base unit 310b are a plurality of cooling ribs 310c. In the mounted condition the cooling ribs 310c are preferably oriented parallel to the axis of rotation of the rotor. Alternatively thereto there can be an angle between the longitudinal axis of the cooling ribs 310c and the axis of rotation of the rotor. That angle can be for example 30°. A first hole or opening 310f and a second hole or opening 310g can be provided on the underside of the base unit. The passages 310d are designed such that a cooling fluid can flow through the passages, in which case the cooling fluid transfers its heat to the cooling ribs 310c and the cooling fluid is thus cooled. The first hole 310f can serve for example to introduce the cooling fluid to be cooled into the passage. The second hole 310g can serve to allow the cooled cooling fluid to flow away.

Figure 14:
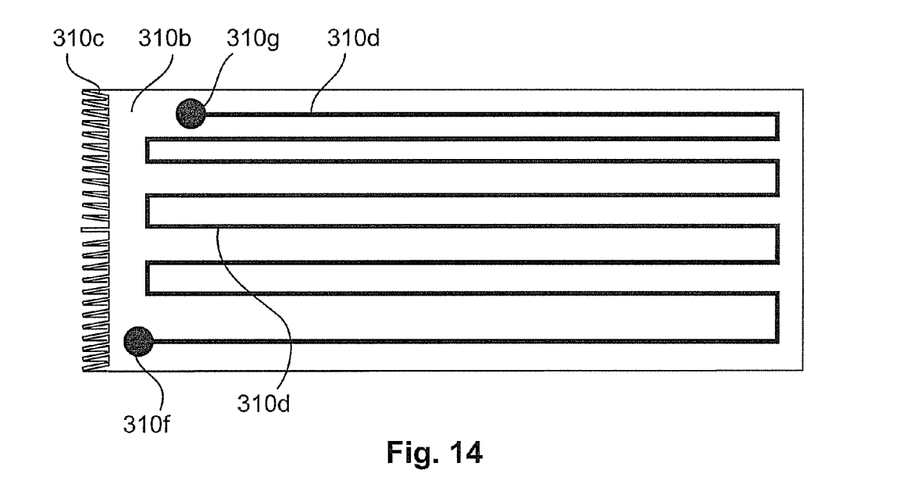
FIG. 14 shows a diagrammatic view of a rear side of the heat exchanger of FIG. 13.

FIG. 14 shows a diagrammatic perspective view of the rear side of the heat exchanger. FIG. 14 shows a rear side of the heat exchanger 310a. The first and second holes 310f and 310g are also shown. In the FIG. 14 example, there is a meander-shaped passage between the first and second holes 310f and 310g, through which the cooling agent or the cooling fluid can flow. The cooling agent to be cooled or the cooling fluid to be cooled is introduced through the first hole 310f and flows through the passage 310d. When flowing through the passage the cooling fluid can give off heat to the heat exchanger, in which case the heat is then given off by the cooling ribs 310c to the ambient air. The cooled cooling fluid can then flow away again through the second hole 310g.

Figure 15:
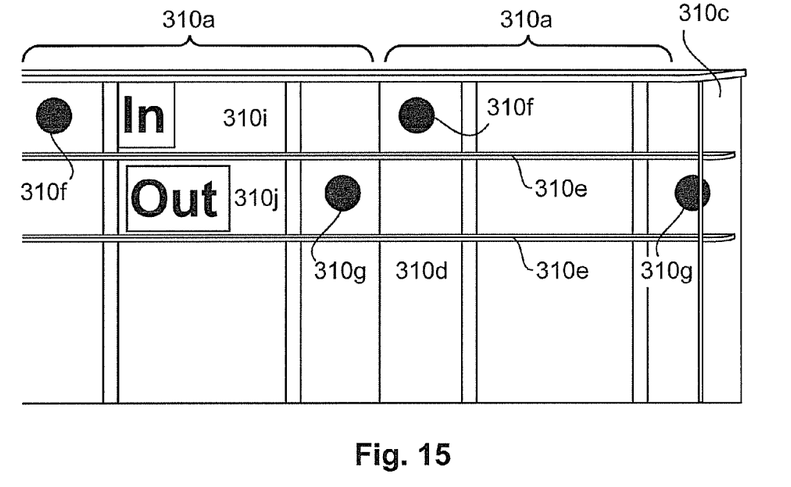
FIG. 15 shows a further diagrammatic view of the rear side of a heat exchanger according to a fourth embodiment.

FIG. 15 shows a further diagrammatic view of the rear side of the heat exchanger of the fourth embodiment. The heat exchanger 310a of the fourth embodiment can be made up from a plurality of modules as shown for example in FIG. 13. In this case the modules are for example welded together. In addition support plates or support limbs 310e can be provided on the inside of the heat exchanger. Three support plates are provided in FIG. 15 so that the support plates provide two passages 310i, 310j. The first passage 310i and the second passage 310j can then be used to feed the cooling fluid to be cooled (first passage 310i) and to transport the cooled cooling fluid away through the second passage 310j. In this case the first passage 310i is of such a configuration that the first holes 310f are in the region thereof. The second passage 310i is of such a configuration that the holes 310g are in the region thereof.

Figure 16:
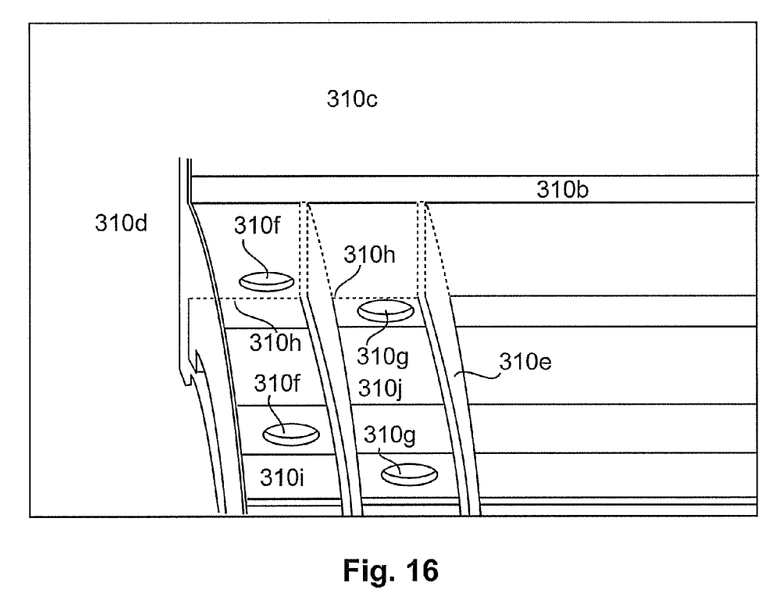
FIG. 16 shows a further perspective view of the rear side of the heat exchanger according to the fourth embodiment.

FIG. 16 shows a further perspective view of the rear side of the heat exchanger of the fourth embodiment. The perspective view in FIG. 14 represents a different view of the heat exchanger shown in FIG. 15. In particular FIG. 16 shows the support limbs 310i which provide the first passage 310i and the second passage 310j each with the first openings 310f and the second openings 310g. The first and second passages can be respectively closed by a cover 310h so that a closed passage can be formed and the cooling fluid to be cooled can flow into the first passage 310i and the cooled cooling fluid can flow away out of the second passage 310j. The cooling ribs according to the invention can have recesses (for example milled out).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wind power installation comprising:
   a pod having a nonrotating part and an aerodynamic rotor;
   a synchronous generator in the pod, the synchronous generator having a generator stator and a generator rotor, the generator rotor being located in the aerodynamic rotor; and a fluid cooling system for cooling the generator rotor, the fluid cooling system having at least one heat exchanger and at least one cooling passage, the at least one cooling passage being located in the generator rotor, the fluid cooling system being configured to allow cooling fluid to flow through the at least one heat exchanger and the at least one cooling passage, wherein the fluid cooling system is at least one of in and at the aerodynamic rotor such that the fluid cooling system is configured to rotate with the aerodynamic rotor, wherein the fluid cooling system is a closed cooling system.

2. The wind power installation according to claim 1 wherein the fluid cooling system has a filter unit for filtering the cooling fluid, a pump unit for pumping the cooling fluid through the cooling circuit, and an expansion vessel.

3. The wind power installation according to claim 1 wherein the generator rotor has a pole shoe carrier having a plurality of pole shoes and at least one cooling passage, the at least one cooling passage being configured to allow cooling fluid to flow therethrough.

4. The wind power installation according to claim 1 wherein the cooling system has a compensation vessel for receiving excess cooling fluid and the compensation vessel is provided in or at the aerodynamic rotor.

5. The wind power installation according to claim 1 wherein the at least one heat exchanger and a portion of the at least one cooling passage are located outside of the aerodynamic rotor of the wind power installation.

6. The wind power installation according to claim 5 wherein the heat exchanger has a base unit having at least one passage and a plurality of cooling ribs that are directed outwardly.

7. The wind power installation according to claim 6 wherein the cooling ribs are oriented in the direction of or at an angle to the axis of rotation of the aerodynamic rotor.

8. The wind power installation according to claim 5 wherein the heat exchanger comprises heat exchanger modules that each have a first and a second opening for feeding and discharging, respectively, of the cooling fluid into the cooling passage.

9. The wind power installation according to claim 8 wherein an inner surface of the heat exchanger has support plates that provide a first and a second passage, wherein the first and second passages serve for the feed and discharge of the cooling fluid.

10. The wind power installation according to claim 1 wherein the at least one heat exchanger is on an outer surface of the aerodynamic rotor.

11. The wind power installation according to claim 1 wherein the at least one heat exchanger extends beyond an outer surface of the aerodynamic rotor.

12. A rotating synchronous generator for a wind power installation, the rotating synchronous generator comprising:
a generator stator,
a generator rotor located in an aerodynamic rotor of the wind power installation; and
a closed fluid cooling system for cooling the generator rotor, wherein at least a portion of the fluid cooling system is provided in the generator rotor, wherein the fluid cooling system has at least one heat exchanger and at least one cooling passage, the at least one cooling passage being located in the generator rotor, the at least one heat exchanger located outside of the aerodynamic rotor of the wind power installation, wherein the at least one heat exchanger is configured to rotate with the aerodynamic rotor, the fluid cooling system being configured to allow cooling fluid to flow through the at least one heat exchanger and the at least one cooling passage.

13. The rotating synchronous generator according to claim 12 wherein the fluid cooling system has a filter unit for filtering the cooling fluid and a pump unit for pumping the cooling fluid through the cooling circuit.

14. The rotating synchronous generator according to claim 12 wherein the fluid cooling system has a compensation vessel for receiving excess cooling fluid.

15. The rotating synchronous generator according to claim 12 wherein the at least one heat exchanger has a base unit having at least one passage and a plurality of cooling ribs that are directed outwardly.

16. The rotating synchronous generator according to claim 15 wherein the cooling ribs are oriented in the direction of the axis of rotation of the aerodynamic rotor.

17. The rotating synchronous generator according to claim 12 wherein the at least one heat exchanger comprises heat exchanger modules that each have a first and a second opening for feeding and discharging, respectively, the cooling fluid into the cooling passage.

* * * * *